United States Patent [19]

Burg

[11] 4,392,445

[45] Jul. 12, 1983

[54] FLEXIBLE BOW AIR RIDE BOAT HULL

[75] Inventor: Donald E. Burg, Miami, Fla.

[73] Assignees: Paulette Renee Burg; Sheri Renee Burg; Daniel Earl Burg; Nicole Renee Burg, all of Miami, Fla. ; part interest to each

[21] Appl. No.: 269,908

[22] Filed: Jun. 3, 1981

Related U.S. Application Data

[63] Continuation-in-part of Ser. No. 207,789, Nov. 17, 1980, abandoned, Ser. No. 69,771, Aug. 27, 1979, abandoned, Ser. No. 818,303, Jul. 25, 1977, Pat. No. 4,165,703, and Ser. No. 737,403, Nov. 1, 1976, abandoned.

[51] Int. Cl.³ ............................................... B63B 1/38
[52] U.S. Cl. .................................................. 114/67 A
[58] Field of Search ....................... 114/67 A, 288–290

[56] References Cited

U.S. PATENT DOCUMENTS

| | | | |
|---|---|---|---|
| 1,835,564 | 12/1931 | Grayson et al. | 114/290 |
| 2,005,473 | 6/1935 | Sanden | 114/67 A X |
| 2,231,296 | 2/1941 | Sartori | 114/291 X |
| 2,234,899 | 3/1941 | Higgins | 114/67 X |
| 3,140,687 | 7/1964 | Beardsley | 114/67 A |
| 3,146,752 | 9/1964 | Ford | 114/67 A |
| 3,331,347 | 7/1967 | Von Heidenstom | 114/67 A |
| 3,473,503 | 10/1969 | Gunther | 114/67 A |
| 3,476,069 | 11/1969 | Mantle et al. | 114/67 A |
| 3,477,400 | 11/1969 | Walker | 114/289 X |
| 3,547,064 | 12/1970 | Glass | 114/289 |
| 3,581,696 | 6/1971 | Ilon | 114/285 |
| 3,698,343 | 10/1972 | Boome | 114/285 |
| 3,702,598 | 11/1972 | Szptyman | 114/67 A |
| 3,742,888 | 7/1973 | Crowley | 114/67 A |
| 3,937,173 | 2/1976 | Stuart | 440/69 |
| 4,046,217 | 9/1977 | Magnuson | 114/67 R X |

Primary Examiner—Sherman D. Basinger
Attorney, Agent, or Firm—Robert J. Van Der Wall

[57] ABSTRACT

An improved performance marine surface vessel with at least one recess that intersects the hull substantially beneath the static waterline thereof, the recess bounded by stabilizing, load-carrying, catamaran-like side hulls, flexible seal member at its forward portion, with downwardly extending generally bow shaped members located at its aft portion and optionally therebetween, with the recess being supplied with pressurized gas to maintain a lift-augmenting, restrained pressurized gas layer under the hull that improves load carrying capability, efficiency and ride quality. The flexible or soft seal member at the front of the vessel absorbs much of the initial wave impact thereby contributing substantially to the exceptional ride quality which, along with efficiency and speed, is a major object of the invention. The aft bow members, and optional intermediate bow sections in some cases, may ride in the water like small bow sections thereby improving hull ride and handling characteristics and reducing gas leakage. In the preferred embodiment of the invention, the catamaran sidehull keels diverge thereby allowing a smaller width seal between the sidehulls forward with resultant smoother ride and less gas leakage forward. The bow shaped members along with the catamaran-like side hulls provide gas restraining means, sure tracking and turning characteristics when underway in any type of sea, and proper hull attitude and trim without wallowing at low speeds or yaw, roll or pitch instabilities at high speeds even if the pressurized gas supply is wholly or partially inoperative.

20 Claims, 12 Drawing Figures

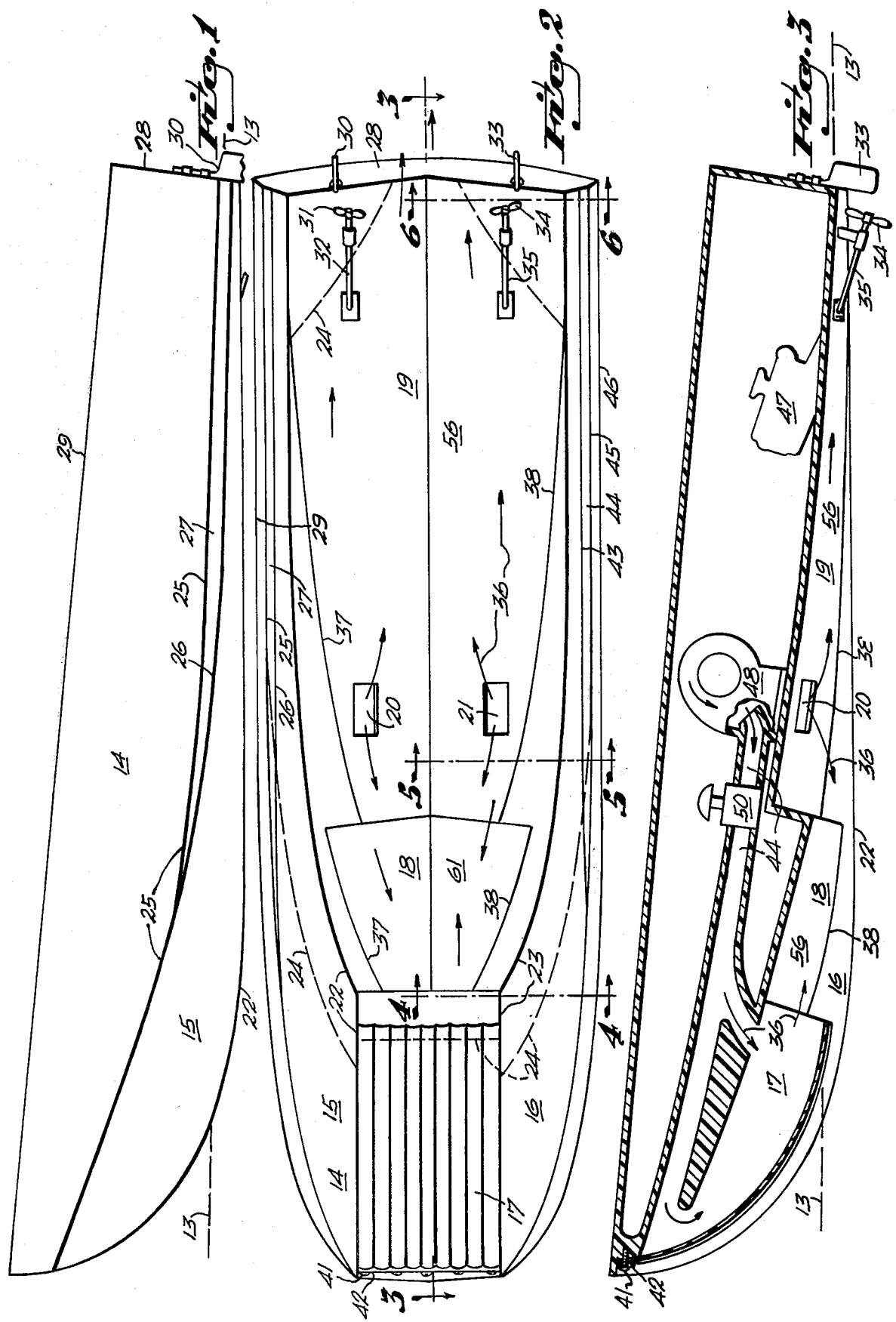

FLEXIBLE BOW AIR RIDE BOAT HULL

CROSS REFERENCE TO OTHER APPLICATIONS

This application is a continuation-in-part to Applicant's earlier applications, Ser. No. 737,403, filed Nov. 1, 1976, now abandoned; Ser. No. 818,303, filed July 25, 1977, now U.S. Pat. No. 4,165,703, issued Aug. 28, 1979; Ser. No. 069,771, filed Aug. 27, 1979, now abandoned; and Ser. No. 207,789, filed Nov. 17, 1980 now abandoned.

FIELD OF THE INVENTION

This invention relates to the field of marine surface vessels supported at least in part by gas trapped beneath the hulls, and more particularly to this type of watercraft which retains substantially the above waterline aesthetics of conventional boats except for having a flexible seal in the bow thereof.

BACKGROUND OF THE INVENTION

This invention constitutes a variation upon and refinement of applicant's earlier invention in the field of this invention, generally entitled "Air Ride Boad Hull". All of these inventions involve the introduction of pressurized gas in one or more recesses under a boat hull to augment hull lift and thereby improve hull load carrying capability, efficiency, ride quality and speed. The recess is bounded by one or more flexible seal members at its forward portion, downwardly extending members at its generally bow shaped aft portion and optionally therebetween, and by stabilizing, load carrying, catamaran-like side hulls that in the preferred embodiment may have diverging keels. The flexible seal at the front of the vessel in this invention absorbs much of the initial wave impact. The latter feature is intended to contribute substantially to the already exceptional ride qualities of vessels that incorporate Applicant's prior air ride inventions.

The combination of these elements is the aforementioned performance advantages over conventional hulls while offering operation, cost, and aesthetic advantages over other pressurized air hull craft. The invention taught herewith handles much like conventional hulls whether the pressurized gas supply is in use or not, costs only slightly more to manufacture and maintain than conventional hulls, and offers generally the same payload space, while maintaining most of the above water aesthetics of conventional hulls.

Even though the idea of introducing air or other gases at ambient or high pressures under boat hulls is not new in basic concept, only a few of the more sophisticated developments have met with any commercial success. However, due to their complex structural requirements and much larger flexible seals than that proposed in the present invention, these inventions generally remain too expensive or impractical for general marine application. The only example of the foregoing that is believed to have any applicability is the Surface Effect Ship (SES) as it is known in the United States. The SES is an outgrowth of the success of the Ground Effect Machine (GEM) as first made workable by Christopher Cockerell over two decades ago in England. The GEM is totally supported by an air cushion and has seals around its full periphery, and as such it is truly amphibious and has little relationship to this invention.

The SES is a marine vehicle with catamaran side hulls connected by a high, wide, cross structure at the top sides and by large flexible seals fore and aft. The SES offers superior ride qualities since the flexible seals yield resiliently to passing waves. However, because of the flexibility of the seals, and a generally flat undersurface, the hull cross structure is designed with a high wave clearing undercarriage. As a result, hull stresses can be very high and a highly stressed heavy hull cross structure is necessary. This is also aggravated by the fact that the SES must be much wider than the conventional hull or the air ride hull for stability purposes because of the SES's higher center of gravity (CG). As a result, even though the SES is very efficient, it compromises much of that advantage to expensive dead structure weight. A one hundred ten foot SES would have an undercarriage clearance of about eight feet and requires some forty feet beam for stability. A similar one hundred ten foot vessel made according to the present invention has a chamber depth of only about eighteen inches and a required beam of only some twenty-eight feet. The reason that the present invention requires so much less beam is because its deck load is only five to eight feet above the water compared to approximately twelve to fifteen feet for the SES because of the high wave clearing undercarriage made necessary by the form of the SES's structure.

However, due to its superior ride quality, very high speed capability, and high efficiency, the SES has received attention for naval and commercial application. This is reflected in extensive patent activity in this art. The most relevant examples include Ford, U.S. Pat. No. 3,146,752, using large flap-like seals fore and aft; Beardsley, U.S. Pat. No. 3,140,687; Mantle, et al., U.S. Pat. No. 3,476,069, which use more flexible fabric type seals fore and aft. The aforementioned inventions are substantially different from the present invention since they use flap-like or flexible seal members in the aft portion of the vessel, have a deep wave clearing undercarriage which utilizes much valuable hull space, have deep static draft requirements, require very wide beams for stability because of high CG characteristics, have inherently high stress hull structures that are heavy and expensive to manufacture, and cannot readily locate propellers under the aft flexible seal members due to vertical movement of the seals. Additionally, the flexible seals are heavy and expensive due to their large size and easy removal of the flexible seals for replacement or maintenance while the SES remains in the water is virtually impossible.

As noted above, the present invention is a derivation from Applicant's other inventive efforts with improved performance marine surface vessels that are in part supported by a pressurized gas layer structurally trapped and restrained beneath the hull. Prior patent filings of Applicant have centered upon vessels having a more or less conventionally shaped bow of hard structure. Actual test results utilizing a forty-two foot craft built in this manner show the viability of the forward bow member. The test vehicle, a forty-two by fifteen foot welded aluminum craft has achieved in actual practice substantial efficiency improvements as compared to conventional hull forms. Based on the test results, it can be said that, in moderate and heavy load carrying applications, conventional hulls will generally require from fifty to one hundred percent more power at planing speeds than a hull with concepts embodied in Applicant's prior inventions in this area. Additionally, the air ride invention normally realizes at least a thirty percent speed advantage. These performance advantages are similar to those experienced by the complex and vastly more expensive SES described above.

Since the bottom line on any commercial venture is cost, it should be considered that a one hundred ten foot off-shore oil industry crew and supply boat built to a conventional design would cost about 1.2 million dollars while a one hundred ten foot SES is in the four million dollar cost range. A one hundred ten foot air ride vessel built according to the present invention would cost thirty percent more than the conventional hull or about 1.6 million dollars. The air ride's higher speed and greater payload capability will pay back any of the cost difference between it and the conventional hull normally within the first year of operation. The difference between the 4 million dollar cost of a one hundred ten foot SES and the 1.6 million dollar for a one hundred ten foot vessel built according to the present invention is enough to cover fixed operating expenses less depreciation of the present invention for over fifteen years.

SUMMARY OF THE INVENTION

With the foregoing in mind, it is the principal object of the present invention to provide a marine surface vessel with extraordinarily smooth ride qualities and significant load-carrying, efficiency and speed improvements compared to conventional hulls while also maintaining low stress and therefore low cost hull structure, shallow draft, flexibility of propulser location, narrower beam, and much more useful hull space when compared to the SES type craft.

Another primary object of the invention is to furnish the foregoing objects and advantages while retaining much of the above water aesthetics and handling characteristics of conventional hull forms.

One more principal object of the invention is to provide a hull which offers very nearly the same low manufacturing and maintenance cost as conventional hulls while offering the aforegoing advantages.

Similarly, a related object of the invention is to offer an inherently strong structure that is more stable when quiescent in comparison to conventional hulls.

Another object of the invention is to offer improved efficiency and speed without significantly affecting the dynamic draft or internal hull space of comparably sized conventional craft.

A further object of the invention is to provide means whereby the forward flexible seal member can be easily changed while the vessel is in the water.

Another object of the invention is to provide means to pressurize the forward flexible seal member and thereby make it respond faster to wave impact.

A related object of the invention is to provide means to regulate the gas pressure supplied to the forward flexible seal member thereby controlling ride quality.

Yet another object of the invention is to provide a hull with diverging catamaran sidehull keels which provides a narrow entry forward with a less wide flexible seal member with resultant better ride qualities and less gas leakage forward.

A further object of this invention is to provide an improved hull embodying the foregoing advantages which is not prone to fouling by debris or to damage thereby.

One more object of the invention is to offer the preceding objects and advantages which changes that did not significantly affect draft of the hull when quiescent, and which will not cripple or seriously hamper use of the vessel if the pressurizing means of the invention are not in use or temporarily rendered inoperative.

Other objects and advantages of the present invention will become apparent from the following descriptions and claims and from the accompanying drawings.

In accordance with the present invention there is disclosed an improved performance marine surface vessel with at least one recess that intersects the hull substantially beneath the static waterline thereof, the recess bounded by stabilizing, load-carrying, catamaran-like side hulls, flexible seal member at its forward portion, with downwardly extending generally bow shaped members located at its aft portions and optionally there-between, with the recess being supplied with pressurized gas to maintain a lift-augmenting, restrained pressurized gas layer under the hull that improves load carrying capability, efficiency and ride quality. The flexible seal member at the front of the vessel absorbs much of the initial wave impact thereby contributing substantially to the exceptional ride quality which, along with efficiency and speed, is a major object of the invention. The aft bow members, and optional intermediate bow sections in some cases, may ride in the water like small bow sections thereby improving hull ride and handling characteristics and reducing gas leakage. The bow shaped members along with the catamaran-like side hulls provide gas restraining means, sure tracking and turning characteristics when underway in any type of sea, and proper hull attitude and trim without wallowing at low speeds or yaw, roll or pitch instabilities at high speeds even if the pressurized gas supply is wholly or partially inoperative.

The bow shaped members not only act as gas flow restrictors, but also add substantially to hull structural integrity and seaworthiness. In the design of the more desirable longer finer hull shapes it is advantageous to locate several bow shaped members athwartships of and interspaced down the length of the recess that impacts with the irregular water surface during rough sea operation. This maintains a series of gas chambers down the length of the hull, that may be interconnected and/or individually pressurized, and minimizes water impact with the underside of the rather shallow recess itself. The bow shaped members are downwardly extending and may have any shape such as inverted-V, V, rounded, W, flat or the like, with the inverted-V being a preferred embodiment because of its simplicity of construction, inherently strong structural characteristics, and good ride qualities.

The forward flexible seal would normally be fabricated from vinyl coated flexible materials although other flexible seal materials and designs are considered within the scope of the invention. In its preferred embodiment pressurized gas is impacted onto the back side of the seal to help seal shape recovery while traversing rough seas. This seal is intended to be easily removable for replacement or repair by removing a series of bolts, plates or the like that can be reached while the boat remains in the water.

The use of diverging keels on the catamaran sidehulls has proven to be very effective and valuable on air ride test craft and is the preferred embodiment for this flexible bow air ride inventive hull also. As an example, on the 42 foot air ride test craft the catamaran sidehull keels are some six feet apart at the forward end of the recess and twelve feet apart aft. This means less gas flow leakage forward and narrower or finer entry forward which contribute to the exceptional ride qualities of these craft.

The catamaran sidehulls employ non-trip chines in their preferred embodiment that aid stability in turns. The 42 foot air ride test craft can negotiate a full 180° turn in less than a 200 foot radius while traveling at an estimated 25 mph. Banking characteristics in a turn are similar to a conventional semi-V hull with the outboard chine higher than the inboard chine. The use of non-trip chines on the catamaran sidehulls contributes to these good handling characteristics.

The invention will be better understood upon reference to the drawings and detailed description of the invention which follow in which:

BRIEF DESCRIPTION OF THE DRAWINGS

FIG. 1 is a side elevation of a boat hull built according to the present invention showing the catamaran keel, outer chine, and non-trip chine.

FIG. 2 is a bottom view of a boat hull built with the invention and showing the recess, the catamaran-like load carrying side hulls, diverging side hull keels, aft and intermediate inverted-V bow members, flexible seal in the bow, inlet ports, and dynamic calm waterline.

FIG. 3 is a centerline cross section of the hull of FIG. 2 showing a gas pressurizing means in relation to the recess, flexible forward seal and flexible seal pressurization means, aft and intermediate inverted-V bow members, and flexible seal removing means.

DETAILED DESCRIPTION

Figure 4:
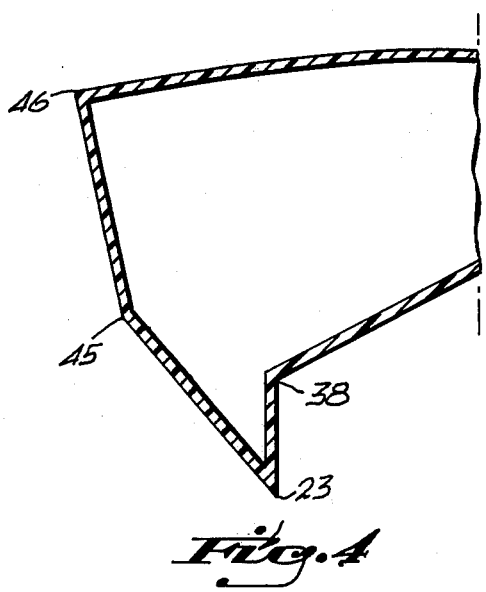
FIG. 4 is a partial cross section taken along the line 4—4 of FIG. 2 showing the catamaran keel and outer chine.

With reference to each of the aforementioned Figures in turn, and using like numerals to designate similar parts throughout the several views, a preferred embodiment and several alternative embodiments will now be described.

FIG. 1 discloses a motorboat with the inventive hull 14 in profile view of the port side which illustrates the resemblance to standard hull forms. Some elements of the port load carrying catamaran sidehull 15 includes the port catamaran keel 22, port inner chine 26, port non-trip chine, 27, and port outer chine 25. The port hull sheer line 29, transom 28, and dynamic waterline 13 are also shown.

FIG. 2 discloses a bottom view of the inventive hull 14. The flexible bow seal 17 includes an easily removable attaching arrangement in its preferred embodiment including such items as attaching bolts 41 and plate 42. Port 15 and Starboard 16 load carrying catamaran sidehulls, aft bow shaped member 19, and optional typical secondary bow member 18 define the recess 56. It will be seen from the drawing that the load-carrying catamaran sidehulls begin near or proximal to the bow or forward portion of the hull. Any number of secondary or recess bow members such as 18 may be utilized if desired and, further, shapes other than the inverted-V shown are acceptable.

The recess 56 gas supply ports 20 and 21 are shown in a typical arrangement although from one to many ports can be utilized and can be located anywhere in the recess 56. The propulsor underwater gear include drive shafts and supports 32 and 35 that project through the gas recess 56. In this version, subcavitating propellers 31 and 34, and rudders 30 and 33 are shown in typical arrangement, although the air ride invention can utilize other propeller types, waterjets and the like if desired and location can be any other suitable location such as under the catamaran sidehulls, aft of the transom, or even on deck in the case of air propulsors.

Other items in FIG. 2 include hull intersect lines 37 and 38, sheer lines 29 and 46, outer chines 25 and 45, inner chines 26 and 43, and non-trip chines 27 and 44. Chines such as the aforementioned are not essential to function of the air ride invention and other designs such as rounded bilges are feasible. However, hard chine designs coupled with one or more non-trip chines is the preferred embodiment for most applications. Note that the catamaran sidehull keels 22 and 23 diverge for at least a portion of the length of the recess 56 in the preferred embodiment of this invention in order to provide a relatively narrow entry forward with resulting good ride qualities, reduced air leakage forward and reduced wetted area aft. These catamaran keels can be parallel for either their whole or partial length if desired and, further, in order to aid sealing at the rear of the recess, can be made to converge aft. Nevertheless, the preferred embodiment is certainly the diverging catamaran sidehull keels as shown.

FIG. 3 discloses a longitudinal cross section along the line 3—3 of FIG. 2. When any gas, such as air, is supplied to the recess 56 through supply ducts or ports such as 20 from any gas supply source or sources at ambient or higher pressures such as from a powered blower 48 in fluid communication therewith, performance improvement results. When at higher than ambient pressures, a hull lift-augmenting force is realized that improves hull lifting capabilities, ride quality, and efficiency. The gas flow arrows 36 show the general direction of gas flow in the recess 56 during dynamic calm sea operation.

The forward soft or flexible seal 17 can be supplied with pressurized gas from a source such as the powered blower 48 through gas ducts 49 with pressure regulated by an optional gas regulating valve 50. This allows variations in firmness of the flexible seal 17 with resultant control of ride quality and flexible seal 17 gas leakage in a seaway. Those features coupled with the preferred embodiment inverted-V downwardly extending bow shaped members 18, 19 result in a cushioned effect to produce an extremely soft ride.

FIG. 3 also shows a typical prime mover engine 47. The blower 48 can be powered by its own engine, not shown, or belt, hydraulic, or other drive means off of other engines such as the prime mover engine 47. Drive shaft 35 subcavitating propeller 34 and rudder 33 can also be seen. Flexible seal 17 intersects the dynamic water line 13 and is attached to the hull using bolt 41 and plate 42. Load-carrying catamaran sidehull 16 is shown extending downwardly from hull 14, which can also be seen clearly in cross-sectional view FIG. 4 in referring to the keel 23 of the sidehull 16.

Turning now to FIG. 4, there is disclosed a partial cross-section taken along the line 4—4 of FIG. 2 disclosing sheer line 46, outer chine 45, catamaran sidehull keel 23, and hull line intersect 38.

Figure 5:
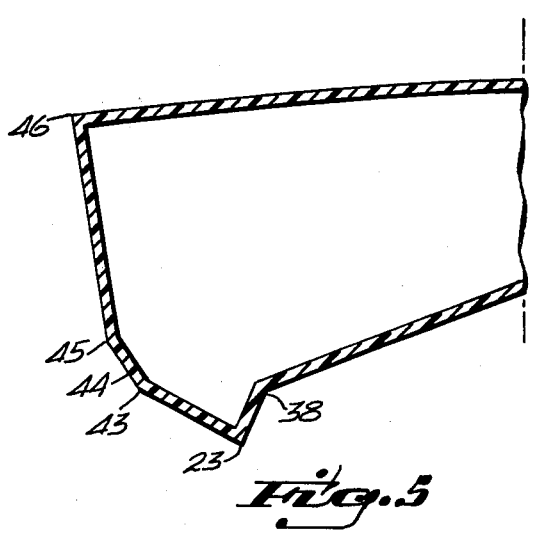
FIG. 5 is a partial cross section taken along the line 5—5 of FIG. 2 showing the catamaran keel, non-trip, and outer chine.

FIG. 5 is also a partial cross-section taken along the line 5—5 of FIG. 2 and illustrates sheer line 46, outer chine 45, non-trip chine 44, inner chine 43, catamaran sidehull keel 23, and hull intersect line 38.

Figure 6:
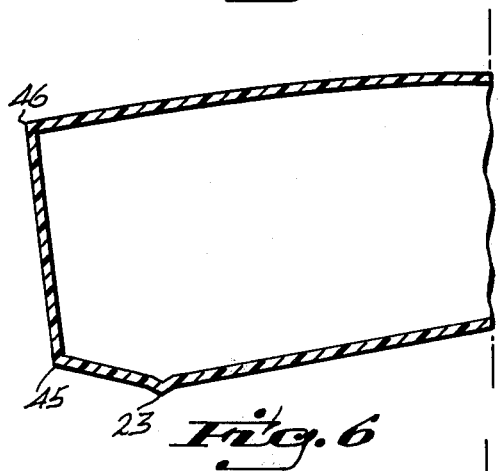
FIG. 6 is a partial cross section taken along the line 6—6 of FIG. 2.

FIG. 6 is a similar partial cross-section taken at the stern of the boat along the line 6—6 of FIG. 2. It also illustrates the location at that point of sheer line 46, outer chine 45, and the trailing edge of catamaran sidehull keel 23.

Figure 7:
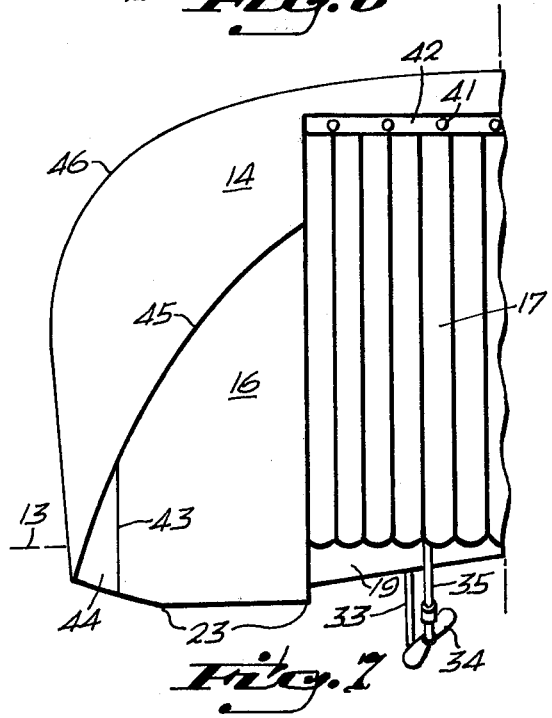
FIG. 7 is a partial front and/or bow elevation of the starboard side of the invention showing the flexible seal and flexible seal removable means, catamaran side hull, outer and non-trip chine.

FIG. 7 is a partial front elevation showing the flexible bow seal number 17, attached to inventive hull 14 by bolt 41 and plate 42. The outer chine 45 is shown in relation to starboard load carrying catamaran sidehull 16, non-trip chine 44, and inner chine 43. Also shown is catamaran sidehull keel 23, dynamic water line 13 and sheer line 46. Beneath flexible seal 17 appears aft bow-shaped member 19, drive shaft 35, subcavitating propeller 34, and rudder 33.

Figure 8:
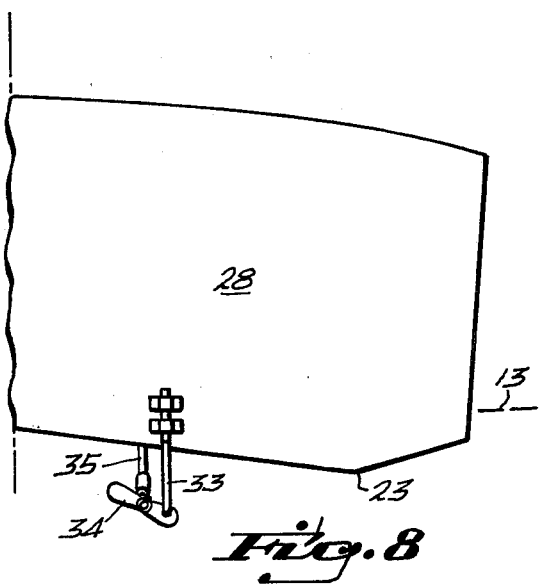
FIG. 8 is a partial rear or stern elevation of the starboard side of the invention.

In FIG. 8 a partial rear elevation is shown of the starboard side of the craft showing transom 28, dynamic water line 13, catamaran sidehull keel 23, and the conventional elements of drive shaft 35, propeller 34, and rudder 33.

Figure 9:
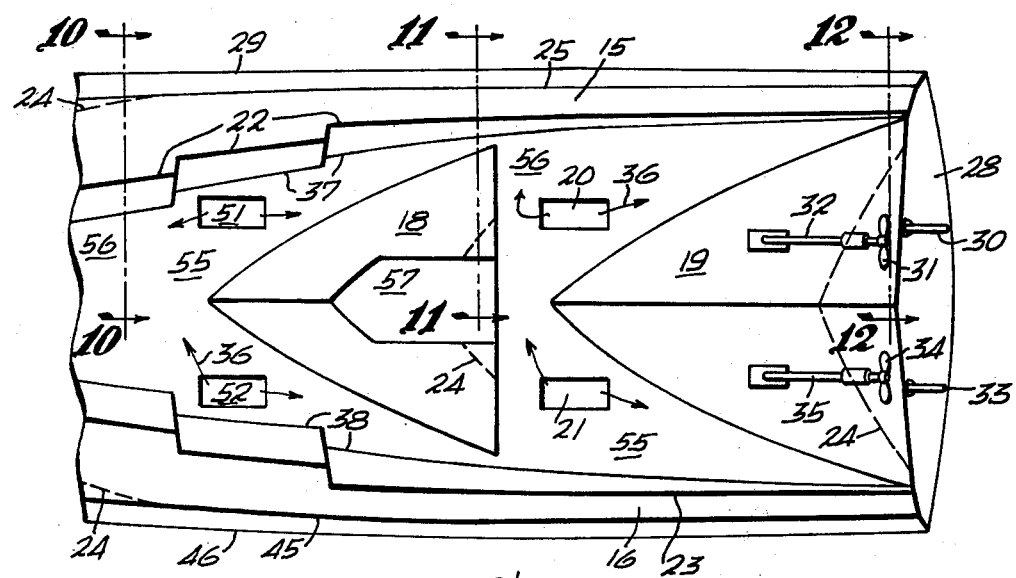
FIG. 9 is a partial bottom view of several alternative embodiments of the hull of FIG. 2 including V-shaped bow members, one with gas passageway and stepped diverging catamaran side hull keels.

FIG. 9 is a partial bottom view showing several alternative embodiments which may be considered as separate alternatives. Shown is an abbreviated form of aft bow member 19 in proximity to drive shaft 32 and 35, propellers 31 and 34, and rudders 30 and 33 mounted on transom 28. Recess 56 is defined by aft bow member 19, load carrying catamaran sidehulls 15 and 16 and forward portions which are not shown in FIG. 9. One of the alternative embodiments shown in FIG. 9 is a secondary bow member 18 containing a further optional feature, air passageway 57. The floor of the recess 55 surrounds bow member 18, and bow member 18 and aft bow member 19 are shown intersecting the dynamic water line 24. In a manner similar to those disclosed in FIG. 2, air inlets are shown forward of the aft bow member 20 and 21, and are duplicated forward of the secondary bow member 18 with inlets 51 and 52. The catamaran sidehulls 15 and 16 may alternatively diverge from the center line of the inventive hull for at least a portion of their length. A further alternative embodiment shown in FIG. 9 is at least one step in the diverging sidehulls as shown at 22. As a result, bow hull intersect lines 37 and 38 are also stepped in the alternative embodiment shown in FIG. 10. Of course, sheer lines 29 and 46 and chines 25 and 46 are also shown as in earlier views.

Figure 10:
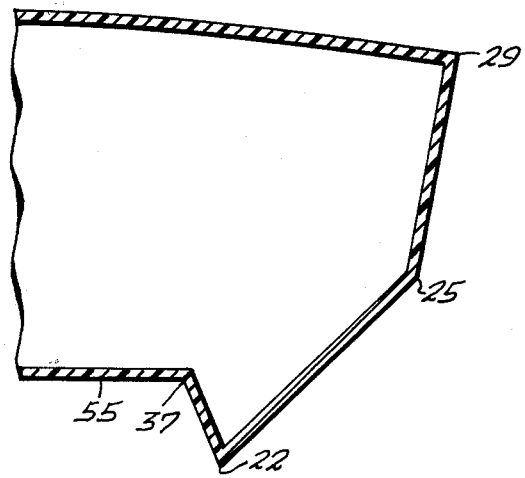
FIG. 10 is a partial cross section taken along the line 10—10 of FIG. 9.

Turning now to FIG. 10, which is a partial cross-section taken along the line 10—10 of FIG. 9, the sheer line 29, chine 25, catamaran sidehull keel 22, hull intersect line 37 and the floor 55 of recess 56 is shown therein.

Figure 11:
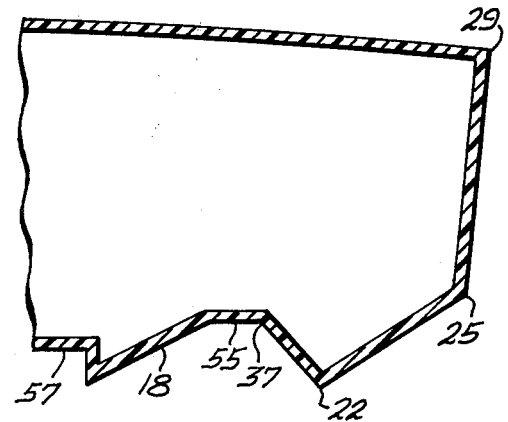
FIG. 11 is a partial cross section taken along the line 11—11 of FIG. 9 showing the catamaran side hull keel and V-shaped bow member with integral gas passageway.

In FIG. 11, which is partial cross-section taken along the line 11—11 of FIG. 10, there is again disclosed sheer line 29, chine 25, catamaran sidehull keel 22, hull intersect line 37, the floor 55 of recess 56, the slope of secondary bow 18, and air passageway 57.

Figure 12:
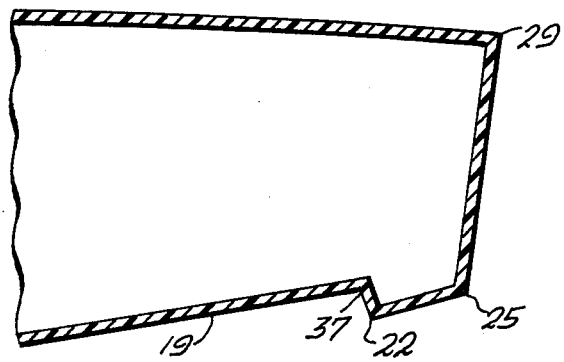
FIG. 12 is a partial cross section taken along the line 12—12 of FIG. 9.

Finally, turning to FIG. 12, which is partial cross-section taken at the very rear of the craft along the line 12—12 of FIG. 9, there is disclosed hull sheer line 29, chine 25, catamaran sidehull keel 22, hull intersect line 37, and aft bow section 19.

While the invention has been described in connection with a preferred and several alternative embodiments, it will be understood that there is no intention to thereby limit the invention. On the contrary, there is intended to be covered all alternatives, modifications and equivalents as may be included within the spirit and scope of the invention as defined by the appended claims, which are the sole definition of the invention.

What is claimed is:

1. In an improved boat hull that is partially supported by a pressurized gas lifting surface including a recess in an underside of the hull, which recess is supplied with pressurized gas from at least one powered gas supply source through at least one gas inlet connected to said recess, and having a gas sealing forward flexible member which is supplied with gas from at least one gas inlet, the improvement comprising:

stabilizing, load-carrying catamaran-like sidehulls beginning at a forward portion of and extending downward from the hull and having keels extending substantially parallel to each other rearwardly from said forward portion of said hull to a point at which they begin to diverge, said gas sealing forward flexible member extending between and substantially to said point of divergence of said substantially parallel portions of said side hull keels; and at least one fixed substantially rigid aft gas sealing bow member extending over a major portion of recess width, said bow member including at least one surface in part curvilinear and at least partially comprising at least one inverted V structure.

2. The hull of claim 1 wherein the catamaran side hull keels diverge by at least one hundred percent (100%) of the distance between them at their forward portions.

3. The hull of claim 2 which further comprises at least one additional bow member proximal to the recess.

4. The hull of claim 1 which further comprises at least one additional bow member proximal to the recess.

5. The hull of claim 4 which further comprises individual fluid communication of gas pressurizing means with individual portions of the recess.

6. The hull of claim 4 which further comprises at least one gas passageway in an underside of at least one of the additional bow members thereby allowing gas to flow between portions of the recess.

7. The hull of claim 1 wherein catamaran sidehull keel divergence is accomplished by at least one outward step in said side hull keel.

8. The hull of claim 1 wherein the gas sealing forward flexible member is pressurized from a pressurized gas source through a pressure regulating device.

9. The hull of claim 1 which further comprises at least one gas sealing forward flexible member that can be detached while the hull is waterborne.

10. The hull of claim 1 wherein the side hulls have non-trip chines.

11. In an improved boat hull that is partially supported by a pressurized gas lifting surface including a recess in an underside of the hull, which recess is supplied with pressurized gas from at least one powered gas supply source through at least one gas inlet connected to said recess, and having a gas sealing forward flexible member which is supplied with gas from at least one gas inlet, the improvement comprising:
   stabilizing, load-carrying, catamaran-like sidehulls beginning at a forward portion of and extending downward from the hull and having keels extending substantially parallel to each other rearwardly from said forward portion of said hull to a point at which they begin to diverge, said gas sealing forward flexible member extending between and substantially to said point of divergence of said substantially parallel portions of said side hull keels; and
   at least one fixed substantially rigid aft gas sealing bow member extending over a major portion of recess width, said bow member including at least one surface in part curvilinear and at least partially comprising at least one V structure.

12. The hull of claim 11 wherein the catamaran side hull keels diverge by at least one hundred percent (100%) of the distance between them at their forward portions.

13. The hull of claim 12 which further comprises at least one additional bow member proximal to the recess.

14. The hull of claim 11 which further comprises at least one additional bow member proximal to the recess.

15. The hull of claim 14 which further comprises individual fluid communication of gas pressurizing means with individual portions of the recess.

16. The hull of claim 14 which further comprises at least one gas passageway in an underside of at least one of the additional bow members thereby allowing gas to flow between portions of the recess.

17. The hull of claim 11 wherein catamaran sidehull keel divergence is accomplished by at least one outward step in said side hull keel.

18. The hull of claim 11 wherein the gas sealing forward flexible member is pressurized from a pressurized gas source through a pressure regulating device.

19. The hull of claim 14 which further comprises at least one gas sealing forward flexible member that can be detached while the hull is waterborne.

20. The hull of claim 11 wherein the side hulls have non-trip chines.

* * * * *